Patented Oct. 12, 1954

2,691,620

UNITED STATES PATENT OFFICE 2,691,620

RECOVERY OF STREPTOKINASE AND STREPTODORNASE

Frank B. Ablondi, Pearl River, N. Y., and Merle Querry, Riverdale, N. J., assignors to American Cyanamid Company, New York, N. Y., a corporation of Maine No Drawing. Application August 18, 1951, Serial No. 242,582

5 Claims. (Cl. 195—66)

This invention is concerned with the production of enzymes and more particularly with methods of isolating enzymes from fermentation media.

Large quantities of enzymes are now being produced by the fermentation of bacteria on culture media. Typical of such enzymes which are produced on a large scale are streptokinase and streptodornase, both of which are produced by the fermentation of beta hemolytic streptococci of the Lansfield groups A, "human C" and G. When such enzymes were produced on a small laboratory scale, isolation of the same was no particular problem for they could simply be precipitated from the fermentation medium by alcoholic precipitation. However, when production was moved to large scale operations the problems accompanying alcoholic precipitation made this method no longer feasible. For instance, in alcoholic precipitation a low temperature must be employed in order that the enzymes will not be destroyed by the alcohol and the cooling of such large volumes of fermentation medium would involve a prohibitive amount of refrigeration. Another problem associated with large scale alcohol precipitation is the tremendous volume of organic solvent required since a volume of alcohol equal to as much as 100% of the fermentation medium is often employed. Thus it will be seen that the use of alcoholic precipitation on a 1000 gallon fermentation would involve a prohibitive expense as well as unduly complicated problems of manipulation.

It has now been found that enzymes comprising streptokinase and streptodornase can be precipitated by a small volume of trichloroacetic acid without enzyme destruction. According to the procedure of this invention, a solution of the enzymes resulting from fermentation is treated with sufficient trichloroacetic acid to give a 0.1% to 5% solution at a temperature of 0° C. to 50° C. and a hydrogen ion concentration of pH 2.0 to pH 5.0; the resulting precipitate is separated and slurried in an aqueous solvent; and the hydrogen ion concentration of the slurry is adjusted to pH 6.5 to pH 8.5 to dissociate the trichloroacetic acid-enzyme complex.

The new process of this invention not only overcomes the difficulties enumerated above but results in the recovery of the enzymes in high yield with practically no, or suprisingly little, destruction. It is indeed surprising that such an insoluble complex of the enzymes can be formed and then dissociated without, at the same time, destroying the activity of the enzymes. Of course, the process also has the obvious advantage as indicated above that the use of large volumes of organic reagents is avoided and this results in an appreciable reduction in operating expenses. The elimination of the necessity for the use of large volumes of organic reagents also enables one to operate with considerably smaller storage facilities and to eliminate several handlings of the fermentation medium. The new process also has the advantage that it may be performed at room temperature, and thus refrigeration may be avoided.

The dead organisms in the fermentation medium may or may not be removed before the trichloroacetic acid precipitation. If the dead organisms are not removed before the precipitation they are occluded by the precipitate and removed therewith. They may then be separated from the more concentrated reconstituted solution with ease. This procedure has the advantage that a much smaller volume of liquid need be filtered or centrifuged and also the advantage that the precipitate of activity is much more readily removed. The procedure has the disadvantage that part of the proteins in the bodies of the bacteria might be leeched by the various agents in the trichloroacetic acid precipitation step and these proteins might sometimes interfere to some extent with subsequent purification. In other words, if one is primarily interested in obtaining a very pure product, the dead organisms may be removed by centrifugation or filtration before the trichloroacetic acid precipitation, but otherwise it is more convenient to perform the trichloroacetic acid precipitation upon the fermentation medium containing the dead organisms and remove the same from the reconstituted solution.

The trichloroacetic acid precipitation may be performed within a wide range of temperatures so long as the temperature is low enough that undue decomposition of the enzymes is not incured and high enough that the solution does not freeze, or in other words, between about 0° C. and 50° C. Temperatures between 20° C. and 40° C. are preferred as a matter of convenience. The hydrogen ion concentration may also vary within relatively wide limits, for instance from about pH 2.0 to about pH 5.0, although for best results the pH should be maintained within the range of about pH 3.0 to pH 4.5. As this is more acidic than the usual fermentation medium an acid should be added to bring the hydrogen ion concentration within this range. Almost any of the common non-oxidizing mineral acids such as hydrochloric, sulfuric and phosphoric, or any of the common non-oxidizing organic acids, such as acetic, may be employed for this purpose. After the temperature and the hydrogen ion concentration of the solution have been adjusted, a volume of trichloroacetic acid is added to give a 0.1% to 5% solution and preferably 0.15% to 0.4% solution. This results in the immediate precipitation of the enzymes.

The precipitate resulting from the trichloroacetic acid addition may be removed by any known method such as filtration or centrifugation. This precipitate is then slurred with a volume of aqueous solvent which is at least sufficient to dissolve all of the enzymes but less than the original volume of fermentation medium. A volume of aqueous solvent sufficient to give a resulting total nitrogen concentration of about 0.2 to 3.0 mg. per cc. will usually be found to be most satisfactory, although a more concentrated slurry is sometimes advantageous as this decreases the volume with which it is necessary to work. The hydrogen ion concentration of this slurry should then be adjusted to within a range of about pH 7.0 to pH 8.5 and preferably pH 7.5 to pH 8.0. Any of the common bases such as the carbonates, acid carbonates and hydroxides of the alkaline earth of alkali metals may be employed for this pH adjustment. This step destroys the trichloroacetic acid-enzyme complex to release the free enzymes. The enzymes may then be recovered by precipitation with a protein precipitant such as a lower alcohol or the solution containing the enzymes can be used directly in further purification procedures.

The following example is for the purpose of illustration only. All parts are by weight unless otherwise indicated.

*Example*

To 735 liters of fermentation medium, after killing the microorganisms, there is added enough hydrochloric acid to bring the pH of the resulting mixture to 4.0. To this mixture there is then added 1,470 grams of trichloroacetic acid dissolved in approximately 15 liters of water. This mixture is allowed to set overnight at room temperature so that the precipitate settles and a clear supernatent is obtained. Approximately 350 liters of the supernatent is siphoned off and discarded and the remaining material is centrifuged. The effluent liquid obtained by centrifugation is likewise discarded.

The collected precipitate is slurried in approximately 90 liters of water and the pH of this slurry is gradually adjusted to 7.6 with 1N sodium hydroxide added dropwise. The suspended cells are removed by centrifugation, leaving approximately 86 liters of clear liquid containing the dissolved enzymes. The enzymes may be recovered from this solution by known procedures for recovering proteins, such as alcoholic purification, or of course, this solution of enzyme material may be used directly in further precipitation procedures if desired.

We claim:
1. A method of recovering streptokinase and streptodornase from fermentation beers containing the same, which method comprises treating said fermentation beer with sufficient trichloroacetic acid to give a resulting 0.1% to 5% solution at a temperature of 0° C. to 50° C. and a hydrogen ion concentration of about pH 2.0 to pH 5, separating the resulting precipitate, forming an aqueous slurry of the precipitate, adjusting the hydrogen ion concentration of the slurry to between about pH 6.5 and pH 8.5 whereby the trichloroacetic acid-enzyme complex is dissociated.

2. The process of claim 1, wherein sufficient trichloroacetic acid is added to give a resulting 0.15% to 0.4% solution.

3. The process of claim 1, wherein the dead organisms are removed from the fermentation beer before said trichloroacetic acid treatment.

4. A method of recovering streptokinase and streptodornase from fermentation beers containing the same, which method comprises treating said fermentation beer with sufficient trichloroacetic acid to give a resulting 0.15% to 0.4% solution at a temperature of 20° C. to 40° C. and a hydrogen ion concentration of about pH 3.0 to about pH 4.0, separating the resulting precipitate, forming an aqueous slurry of the precipitate, adjusting the hydrogen ion concentration of the slurry to about pH 7.5 to about pH 8.0 whereby the trichloroacetic acid-enzyme complex is dissociated.

5. A method of recovering streptokinase and streptodornase from fermentation beers containing the same, which method comprises adjusting the temperature of said beer to between 20° C. and 40° C., adding hydrochloric acid to said beer until the hydrogen ion concentration is between pH 3.0 and pH 4.0, adding a quantity of trichloroacetic acid sufficient to give a resulting 0.15% to 0.4% solution, separating the resulting precipitate, forming an aqueous slurry of the precipitate having a total nitrogen concentration of about 0.2 to 3.0 mg. of combined nitrogen per cc., adding sodium hydroxide to said slurry until the hydrogen ion concentration is about pH 7.5 to pH 8.0 whereby the trichloroacetic acid-enzyme complex is dissociated.

References Cited in the file of this patent

Chemical Abstracts 41: 7428 (c) Christensen (J. Gen. Physiol., 30, pages 465–473), 1947.

Sumner et al., The Enzymes, vol. I, Part 2, Academic Press Inc., pub., N. Y., 1951, page 1149.